Patented June 3, 1947

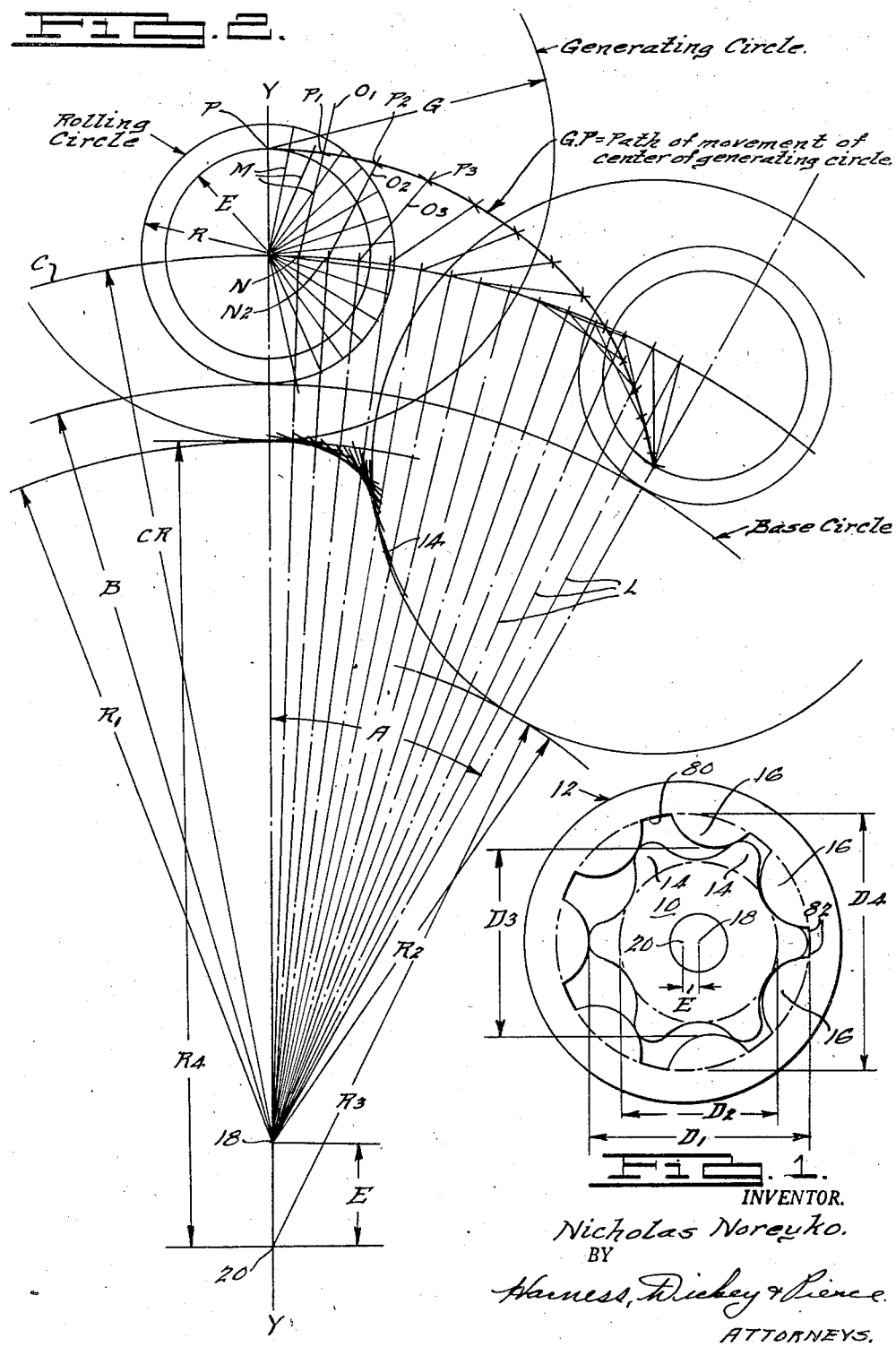

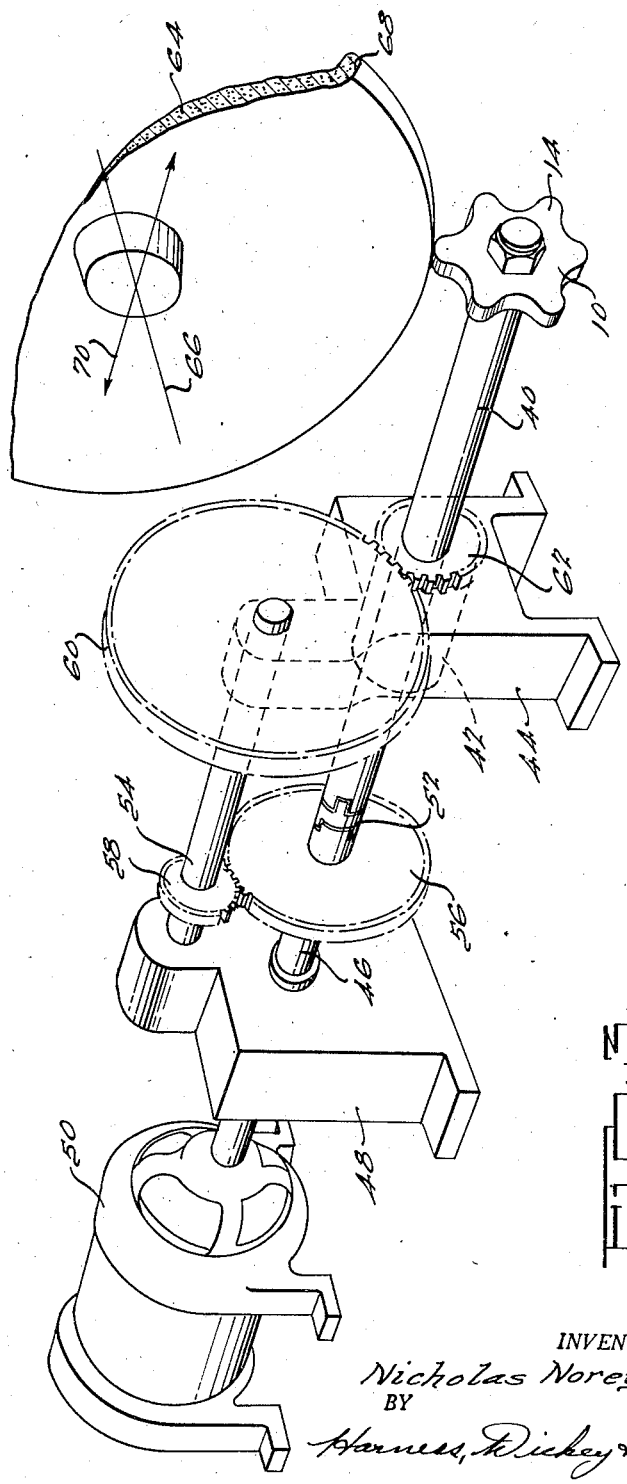

2,421,463

UNITED STATES PATENT OFFICE 2,421,463

GEAR ELEMENT

Nicholas Noreyko, Detroit, Mich., assignor to Eaton Manufacturing Company, Detroit, Mich.

Application June 1, 1944, Serial No. 538,300

4 Claims. (Cl. 74—462)

This invention relates to gear elements and particularly to those of a type applicable for use in internal-external gear type fluid pumping mechanism. It is further limited to that type of such mechanisms in which the inner gear element has one less tooth division than the outer gear element, is mounted eccentrically with respect to the outer gear element and the tooth curvatures are such that the teeth of the inner gear element maintains substantial contact with the teeth of the outer gear element over a major if not the entire rotational position thereof so as to provide a plurality of pumping chambers between the cooperating element which chambers increase in volume in the direction of rotation from the position of full mesh between the teeth of the elements to the position of open mesh thereof and decrease in volume from the latter position to the former position in the direction of rotation of the elements.

Various forms of tooth curvatures have heretofore been proposed for use in this general type of construction but it is believed that the tooth curvature provided in accordance with the present invention provides a superior type of engagement between the teeth both from the standpoint of wear and noise, it provides a type of tooth curvature that may be readily and simply determined by a layout on a drafting board and which may be readily machined.

In accordance with the present invention cooperating gear elements of any desired number of teeth in excess of two may be provided the only requirement being, of course, that the inner gear element have one less tooth division or one less tooth than the outer gear element. For the purposes of illustration a so-called 6-7 pair of such elements is illustrated in the drawings, the method therein disclosed being capable of adaptation by those skilled in the art to similar gear elements having different numbers of teeth.

Referring now to the drawings in which like numerals refer to like parts throughout the several different views, Fig. 1 is an end elevational view of a pair of gear elements of the type described and constructed in accordance with the present invention;

Fig. 2 is a layout illustrating the method and manner of determining the curvature of the teeth for the gear or rotor elements shown in Fig. 1; and Fig. 3 is a more or less diagrammatic, perspective and partially broken view illustrating a form of apparatus by means of which the inner rotor or gear element shown in Fig. 1 may be accurately machined to the desired external contour.

Referring to Fig. 1 a pair of cooperating gear or rotor elements of the type described is shown as comprising an inner gear element indicated generally at 10 and an encompassing outer gear element indicated generally at 12. The inner gear element 10 is shown as having six equally angularly spaced teeth 14 on its periphery and the outer gear element 10 is shown as being provided with seven equally angularly spaced inwardly projecting teeth 16. The inner gear element 10 is mounted for rotation about an axis 18 and the outer gear element 12 mounted for rotation eccentrically thereto about a parallel axis 20.

In properly designed devices of the type shown and described each time a tooth of the inner rotor, such as a tooth 14 in the construction shown, becomes centrally aligned with a plane including the axes of both of the rotors and on that side of the axis 20 of the outer rotor on which the axis 18 of the inner rotor lies, such tooth is fully engaged between a pair of teeth such as 16 of the outer rotor, while under such conditions on the diametrically opposite side of the axes of the rotors, and where the inner rotor has an even number of teeth as in the case shown, the crown of one of the teeth 14 on the inner rotor is in substantial contacting relation centrally with the crown of one of the teeth 16 of the outer rotor.

Intermediate the last two positions described the teeth of the inner and outer rotors are preferably in substantially contacting relationship with respect to each other regardless of the relative rotatable positions of the elements. The two elements are, therefore, in relative driving engagement with respect to each other and rotation of one necessarily causes rotation of the other, and during such rotation pumping chambers are opened up between the cooperating teeth of the elements from the full mesh position in the direction of rotation, shown at the righthand side in Fig. 1, to the open mesh position shown at the lefthand side in Fig. 1, and such pumping chambers decrease in volume from the open mesh position shown at the lefthand side in Fig. 1, in the direction of rotation of the elements, to the full mesh shown at the righthand side in Fig. 1. These expanding and contracting pumping chambers are made use of by providing the two elements with a suitable ported enclosure in accordance with conventional practice to provide a fluid pump.

It will be appreciated from the foregoing that in order to provide cooperating rotor or gear elements of the type described having no more clearance between the cooperating teeth thereof that is ordinarily required for proper lubrication, that a generated relation of the teeth of one of the elements with respect to the teeth and tooth spaces of the other of such elements must be had except that clearance is preferably provided at the bottom of the tooth spaces of one of the elements for the purpose of receiving any foreign material that may find it way between the elements, this being at a point where a non-driving relationship exists between the teeth of the two elements and, therefore, will not affect the proper operation thereof.

There are certain well understood relations which must exist between such cooperating rotor or gear elements and these are set forth as follows understanding that the indicated symbols refer to the indicated dimensions or other features thereof.

$E$ = eccentricity of the axes of the two elements
$N_1$ = number of teeth of the outer element
$N_2$ = number of teeth of the inner element
$D_1$ = the major diameter of the inner element, that is a circle including the pits of the teeth of the inner element
$D_2$ = the minor diameter of the inner element, that is the diameter of the circle including the bottoms of the tooth spaces without clearance.
$D_3$ = the minor diameter of the outer element
$D_4$ = the major diameter of the outer element
Likewise, $R_1$, $R_2$, $R_3$, and $R_4$ are the radii of circles having diameters $D_1$, $D_2$, $D_3$, and $D_4$, respectively.
$L$ = the axial length of the elements (1) $$\frac{D_4 - 2E}{E} = 2N_1$$

(2) $$\frac{D_2 + 4E}{2} = 2N_1$$

(3) $$D_3 = D_4 - 4E$$

(4) $$D_1 = D_4 - 2E$$

(5) $$D_2 = D_1 - 4E$$

(6) $$\frac{\pi}{4}(D_1^2 - D_2^2) \times L = \text{capacity}$$

In gear or rotor elements of the type described it is desirable that the teeth of the two elements over the effective driving range between them have as flat a contact between them as possible, one in which the pressure angle between the teeth is as small as practical, and of such character that a minimum of slip occurs between the teeth in the driving range, these features all contributing to long life and quietness in operation of the elements. These last requirements are necessarily modified from a practical standpoint by the necessity of providing teeth on the rotor or gear elements that are practical to form commercially. For this reason it is desirable that the teeth of the outer or internally toothed rotor or gear element be of partially circular section, the teeth of the inner or externally toothed element bearing a generated relation with respect thereto. This is so as by this means a cutting element having a circular or partially circularly sectioned cutting edge may be employed for generating the teeth on the inner rotor or gear element and a readily produced form tool may be employed for forming the teeth on the outer or internally toothed element. The present invention follows this same procedure.

It follows from the above that the tooth form of internal rotor is of paramount importance and it is the object of the present invention to provide a form for the teeth of the internal rotor that incorporates as far as possible the desirable features above mentioned. In the present instance this tooth form is obtained first by providing a base circle concentric with the inner rotor element and rolling thereon a second circle, herein identified as the rolling circle, without slippage. This rolling circle is of such diameter that it will make the same number of complete revolutions on the base circle in travelling 360° around the base circle, as the desired number of teeth on the inner rotor. The path of movement of a point on such rolling circle, and spaced from the axis of the rolling circle by a distance equal to the eccentricity (3) of the two rotor or gear elements, is employed for the path of movement of the center of the generating circle employed for generating the tooth form on the inner rotor or gear element. In accordance with the present invention the radius (R) of the rolling circle must be greater than the eccentricity (E) between the two rotor elements in order to obtain the desired tooth form. Also, knowing the ratio that obtains between the rolling circle and the base circle $$\left(R = \frac{B}{N_2}\right.$$

where B equals the radius of the base circle) and that the radius (G) of the generating circle plus $R_1 - E$ is equal to R plus B, the values for R and B may be readily determined when $D_4$ is known and G is assumed. By varying the diameter of the generating circle variations of tooth form may be obtained. Generally speaking the radius of the generating circle is of major importance inasmuch as if it is too large the teeth of the outer rotor will merge into one another, thus resulting in pointed teeth for the inner rotor which are commercially unsatisfactory. On the other hand if the radius of the generating circle is too small then an undercutting of the teeth of the inner rotor will occur in manufacture which results in a loss of the sealing engagement between the teeth of the inner and outer rotor, and the desirable characteristics of the construction are thereby lost. The desired value for the generating circle, of course, lies somewhere between these two limits and the particular diameter of the generating circle eventually employed will, of course, depend upon the ideas of the individual designer as to what he considers the best tooth form.

The above minimum and maximum radius or diameter of the generating circle may be determined by the following formulae where the following symbols refer to the indicated dimensions as previously noted.

$B$ = radius of base circle
$R$ = radius of rolling circle
$G$ = generating radius The formula for the minimum radius capable of being employed for the generating circle without undercutting of the teeth may then be determined by the following equation:

(7) $$B + R + E = \frac{D_1}{2} + G$$

By means of another equation we know that $B=RN_2$. Substituting this in the first equation we obtain the following:

(8) $$RN_2+R+E=\frac{D_1}{2}+G$$

$$G=RN_2+R+E-\frac{D_1}{2}$$

Assuming R to be its minimum value and, therefore, equal to E we have $R=E$, under which circumstances we obtain $$G=E(N_2+2)-\frac{D_1}{2}$$

The approximate minimum generated radius may then be calculated by substituting the proper values in the above equation.

To find the maximum generating radius capable of being commercially employable the following formula is employed, employing the same symbols as previously noted:

(9) $$G=\frac{\left(2R\sin\frac{\pi}{N_2}\right)^2+4\left(R\cos\frac{\pi}{N_2}-R+2E\right)^2}{8\left(R\cos\frac{\pi}{N_2}-R+2E\right)}$$

By substitution of the proper values for the various symbols in the above formula the maximum radius for the generating circle may be determined. However, and as indicated above, it is unlikely that either the minimum or maximum radius of the generating circle employable and as determined by the above formulas will be employed in any case, as usually a number of values between these limits will be employed to lay out a tooth curve and that found to result in the best curvature, in view of the consideration previously pointed out, will usually be selected as the one for actual use.

A concrete example of the method followed in forming a pair of gear or rotor elements in accordance with the present invention will aid in the understanding of the method of determining a tooth curvature in accordance with the present invention, and, therefore, is set out below. Let it be assumed, for instance, that it is desired to form a pair of such rotors in which the outer element has an outside diameter of 1.75", this outside diameter being a limiting factor in the particular case assumed. Let it also be assumed that the unit will be of a 6 x 7 tooth type, that is, the inner rotor will have six teeth and the outer rotor will have seven. Also, let it be assumed that in the particular case in question the pump will be required to pump a pressure of several hundred pounds per square inch and for this reason the minimum radial wall thickness of the outer rotor requires that it be at least $\frac{7}{32}$ of an inch which is the radial distance measured between the bottom of a tooth curve of the outer rotor and its periphery. It will, therefore, be appreciated that $D_4$, the major diameter ($D_4$) of the outer rotor will be 1.75"−2×0.21875" or 1.3125". According to Formula 1 and employing the value for $D_4$ thus obtained we have $$\frac{1.3125''-2E}{E}=14$$

from which we find that $E=0.082''$.

Inasmuch as according to Formula 3 $D_3=D_4-4E$ and with the values for $D_4$ and $E$ already determined we find that $D_3=0.9845''$.

Also, knowing according to Formula 4 that $D_1=D_4-2E$ we find that $D_1=1.1485''$.

Also, knowing according to Formula 5 that $D_2=D_1-4E$ we find that $D_2=0.8205''$.

Knowing the desired capacity of the pump, Formula 6 is then employed to determine the axial length of the rotor or gear element.

The principal dimensions of the two elements thus being determined, it is next necessary to determine the shape of the teeth thereof. Accordingly, knowing that in accordance with the present invention the path of the center of the circularly sectioned generating tool will follow the path of a point on a circle rolling about a base circle concentric with the inner rotor and will make as many complete revolutions as the number of teeth desired on the inner rotor, it is understood that the major radius of the inner rotor ($R_1$) plus the radius of the generating circle (G) equals the eccentricity (E) between the two rotors plus the radius of the rolling circle (R) plus the radius of the base circle (B). It is also known that the ratio between the base circle and the rolling circle is equal to the number of teeth on the inner rotor so that $$\frac{B}{R}=N$$

By laying out the major circle of the outer rotor and dividing it up into equal angular segments equal in number to the number of desired teeth on the outer rotor, and knowing that these teeth will be of partially circular section and of such diameter that their circles will not intersect each other (the latter so that the teeth of the inner rotor will have an appreciable width at their tips) a tentative radius for the generating circle may be assumed.

For the purposes of explanation with the principal dimensions of the two rotor or gear elements as above determined let it be assumed that a generating radius of 0.250" is first assumed. Then in accordance with the above formula $$R_1+G=E+R+B$$

we find that:

$$0.57425''+.250''=0.082''+R+B$$

Substituting $R\times6$ for B we have $$0.82425''=6R+R+.082''$$

or $$7R=0.74225''$$

and $$R=0.106''$$

B then equals 6R or 0.636".

If desired formulae numbers 8 and 9 may then be employed to determine if the value of G is within the permissible limits determined thereby and if so, as may be assumed here, then the shape of the tooth may be found by the method shown in Fig. 2.

Referring now to Fig. 2 it will be first understood that in laying out a tooth curvature in accordance with the present invention the values found as above stated are laid out on a drawing and, where necessary, as in the case of small rotors of the sizes above assumed and determined, several times size so that an accurate visual determination of the tooth curvature may be obtained. For instance, in the particular case under consideration it may be assumed that the dimensions may be employed at ten times their value so that in making the layout and particularly when employing the values obtained under the concrete example above assumed, it will be understood that in applying such values to a description in Fig. 2 ten times, or some other multiple of such value, will be actually used although not specifically referred to.

Referring now to Fig. 2 a vertical axis YY is first laid out and upon it is located the axis 18 for the inner rotor. Below it and on the axis YY at a distance equal to the eccentricity E determined, the center 20 of the outer rotor may be located if desired, but is not necessary. The base circle is then struck from the center 18 with a radius equal to B. The center of the rolling circle is thereupon located on the axis YY at a point above the intersection of the base circle with the axis YY equal to R and the rolling circle is thereupon struck about such axis, it being tangent to the base circle under such circumstances, as shown. A second circle is thereupon struck about the axis of the rolling circle and with a radius equal to E. This last circle will always be smaller than the rolling circle in accordance with the present invention. If it is desired, in laying out the tooth curvature, that the crown of one of the teeth 14 of the inner rotor 10 is to lie centrally on the axis YY, the center of the generating circle, when its center is on the axis YY, will be at that point on the axis YY where the circle with the radius E intersects the axis YY radially outwardly of the center of the rolling circle from the center 18, namely at the point P in Fig. 2. As previously explained, it will be the path of movement of the point P, as the rolling circle rolls about the base circle without slippage, that will determine the path of movement of the center of the generating circle for the teeth 14 of the inner rotor. With this in mind it is, therefore, necessary to determine the path of movement of the point P as the rolling circle rolls about the base circle, and although various methods may be employed for this purpose the method followed in Fig. 2 is as described below.

First, knowing that each half of each tooth 14 and the tooth spaces between the teeth of the inner rotor 10 will be identical throughout and that it is, therefore, only necessary to determine the form of one-half of a tooth and one-half of a tooth space, an angle A is laid off from the axis YY about the center 18 as indicated, which angle A is equal to the angular extent of one-half of one of the teeth 14 in one-half of the adjacent tooth space. As will be appreciated, the angle A will equal 360° divided by twice the number of teeth selected for the inner rotor, in the particular case under consideration as an example, 360° divided by 12, or 30°. The angle A is then subdivided by a plurality of equally angularly spaced lines L which are extended into intersecting relationship with respect to a circle C struck from the center 18 and having a radius CR equal to the distance between the center of the rolling circle R and the point 18, such circle thus representing the path of movement of the center of the rolling circle as it rolls about the base circle.

The righthand half of the rolling circle is then divided by the lines M, equal in number to the lines L, into the same number of equal angular segments as the angle A is divided by the lines L. This is done because we know that the point P will travel 180° about the center of the rolling circle as the center of the rolling circle travels about the base circle through the angle A. The points of intersection of the lines L with the circle C represents successive positions of the center of the rolling circle as it rolls on the base circle through the angle A and the successive positions of the point P corresponding therewith may be determined as follows.

When the rolling circle rolls from the position shown in full lines in Fig. 2 in a clockwise direction about the base circle until its center will have moved through the first subdivision of the angle A, its center line will lie on the point N which is the point of intersection of the first line L to the right of the axis YY with the circle C. During this movement the point P will have rotated about the axis of the rolling circle through an angular distance represented by the angle between two adjacent lines M, so that if a line such as $O_1$, parallel to the first line M from the axis YY above the center of the rolling circle, is laid out through the point N and an arc is struck from the point N with a radius equal to E, and in the same direction from the point N as such first line M extends from the center of the rolling circle, it will intersect the lines $O_1$ at a point $P_1$ which thus represents the corresponding position of the point P when the rolling circle has rolled upon the base circle a corresponding extent.

Similarly if another line such as $O_2$ parallel to the second line M in a clockwise direction from the point P is laid out from the point of intersection of the second line L with the circle C, in a clockwise direction from the axis YY, and an arc of a radius equal to E is struck from such point of intersection, it will locate the point $P_2$ which is the position of the point P which corresponds with the corresponding position of the rolling circle on the base circle. This same procedure, namely laying out a line through each point of intersection of each line L with the circle C, parallel to the corresponding line M, and striking off an arc having a radius E from such point of intersection, is continued until the corresponding position of the point P for each of such positions is determined, upon which a curve GP representing the path of movement of the center of the generating circle, may be drawn through all of such points thus determined. If now arcs of a radius equal to G are struck from various points along the curve GP they will outline the contour of one-half of a tooth 14 and the associated half of a tooth space between such teeth, all as illustrated in Fig. 2.

The tooth curvature thus developed and particularly where it is of the enlarged scale described, may be visually inspected to determine its acceptability, that is whether it has a desirable thickness at the crown thereof, whether it provides a sufficiently great degree of curvature over those portions thereof through which it will give or take its driving movement (to insure good wearing qualities), and whether the curvature thus provided does or does not establish an unduly high pressure angle between it and the teeth of the cooperating outer rotor. If upon such inspection it appears that the form is lacking in any one or more of the above described features a new layout may be made with a different radius of curvature for the generating circle and the above described process repeated, until a tooth form having the desirable, or at least acceptable, characteristics is obtained.

While in the broader aspects of the invention once the tooth curvature as above explained has been determined and found satisfactory a form tool of such shape may be produced and employed in a well known manner for duplicating such curvature on the teeth of an inner rotor element, such procedure would be inadvisable both from a standpoint of difficulty in accurately reproducing the desired tooth form, and more particularly from the standpoint of cost of manufacture of such rotor elements. This brings up the point of the desirability of employing a circularly sectioned tooth for the outer rotor as it will be appreciated by those skilled in the art that if a forming tool having a radius equal to G, the radius of the generating circle, is operatively associated with a blank for the inner rotor, and its axis is caused to travel about the curve GP and continuations thereof which would result by further tracing the path of the point P while the rolling circle rolls completely about the periphery of the base circle, an inner rotor of the desired tooth form and one accurately formed in accordance therewith will be provided.

To cause such generating tool to be moved with its center following the path GP and extensions thereof as described is not at all difficult. For instance, a cylindrical milling cutter arranged with its axis parallel to the axis of the inner rotor 10 and rotatable about its own axis may be mounted in operative relation with respect to a blank for such inner rotor. The milling cutter in such case will of necessity be of a radius equal to G and will be mounted for bodily rotation of its axis in a circle having a radius equal to E and with the center of such circle spaced from the axis of the blank by a distance equal to CR. The milling cutter may then be rotated about its own axis and simultaneously bodily rotated in a circle having a diameter E as above described, and the blank for the inner rotor 10 may be simultaneously rotated. In such case the milling cutter will be bodily rotated about its bodily rotatable axis that many times as fast as the rotation of the blank as the desired number of teeth on the inner rotor, the result being that the axis of rotation of the milling cutter will follow a path equivalent in all respects to the curve GT and continuations thereof as above described. Relative movement between the axis of bodily or eccentric movement of the milling cutter and the center of the blank may be varied in actual practice in order to take successive cuts from the blank and until the exact major diameter determined for the inner rotor is reached, upon which the rotor will be formed in exact accordance with that determined by the layout aforesaid.

On the other hand a grinding wheel may be arranged with its axis perpendicular to the axis of rotation of the blank, its periphery dressed to the radius of the generating circle or G, and relative rotation and bodily shiftable movement effected between the blank and the wheel to obtain the same result. In this last case, however, it will be appreciated that during the operation it will be necessary to effect relative feeding movement between the wheel and the blank axially of the blank in order to bring the peripheral surfaces of the blank into parallelism with its axis. Apparatus for carrying out the last-described method is illustrated in a more or less diagrammatic representation of a machine in Fig. 3.

Referring now to Fig. 3, the inner rotor, as in the previous views, is illustrated at 10 and as being provided with six teeth 14. It is shown suitably and concentrically mounted upon the end of a spindle or arbor 40. The spindle or arbor 40 is rotatably mounted in a bushing or sleeve 42 which in turn is rotatably supported in a suitable fixed support 44. The spindle or arbor 40 is not centrally mounted in the bushing 42. Rather it is eccentrically mounted therein, such eccentricity being equal to the eccentricity E which has been determined for the set of rotors in which the particular rotor 10 being operated upon forms a part. In the present case and in accordance with the example previously given such eccentricity would be 0.082" as will be appreciated. Rotation is imparted to the mandrel or spindle 40 from a shaft 46 rotatably mounted in a suitable support 48 and driven by an electric motor 50 through an Oldham coupling indicated generally at 52 which thereby permits the shaft 46 to turn about a fixed axis and the mandrel or spindle 40 to turn about an axis eccentric to its own axis.

It will be appreciated that in the particular apparatus shown, it is the blank for the rotor 10 that is caused to travel bodily about the circle of a radius E with respect to the cutting tool, the cutting tool remaining at a fixed distance, at least during each cut, with respect to the center about which the blank is bodily and eccentrically rotated. For this reason it is necessary that the sleeve or bushing 42 in which the mandrel or spindle 40 is eccentrically mounted be rotated through the same number of complete revolution of the blank for the rotor 10 as the desired number of teeth on the rotor 10, in the particular case under consideration six. Accordingly there is mounted between the supports 44 and 48 a shaft 54. A pair of gears 56 and 58 secured to the shaft 46 and 54, respectively, serves to drive the shaft 54 from the shaft 46. Another gear 60 fixed to the shaft 54 lies in mesh with a gear 62 concentrically fixed to the sleeve or bushing 42. The combined ratio of the pairs of gears 56 and 58, and 60 and 62, is such, in the particular example under consideration, that the sleeve or bushing 42 is rotated six times as fast as the mandrel or spindle 40. Thus the blank for the inner rotor 10 is caused to approach and recede from the surface of a cooperating grinding wheel 64 six times during each complete revolution of the blank for the inner rotor 10.

In the particular case shown the grinding wheel 64 is mounted about an axis 66 which is perpendicular to the axis of the mandrel or spindle 40, its plane of thickness lies in a plane including the axis of rotation of the sleeve or bushing 42, and its periphery is dressed to a curvature indicated at 68 which is partially circular in section and of a radius equal to the radius of the generating circle employed in determining the curvature for the teeth of the rotor blank being worked upon, namely, the radius G. Where such a grinding wheel is employed, it will be appreciated, of course, that relative movement between the wheel and the work axially of the work, that is in the direction of the arrow 70, will be required in order to completely finish the rotor 10 being worked upon and, depending upon circumstances, means will necessarily be provided for effecting relative approach between the wheel and the work radially of the wheel for the purpose of taking successive cuts on the work or, in any case, for readjusting the relative positions of the wheel and the work each time the periphery of the wheel is dressed.

It will be appreciated from the above that with apparatus of the type illustrated in Fig. 3, that is, apparatus in which equivalent movement between the cutting element and the work is provided, where the eccentricity between the equivalent of the mandrel or spindle 40 and the sleeve or bushing 42 is equal to the eccentricity (E) determined in laying out a desired form for an inner rotor, such tooth form will be accurately and faithfully reproduced.

As previously mentioned, where a generating circle has been employed as above described in laying out the tooth curvature for the inner rotor of sets of rotors or gears of the type described, the teeth of the outer rotor will be of partially circular section, the radius of curvature of which will be equal to the radius of the generating circle employed. Due to the fact that the point P which traces the path of movement of the generating circle is within the diameter of the rolling circle, the center of curvature of the teeth of the outer rotor will always lie radially outwardly beyond the major diameter of the outer rotor. The distance of the center of curvature of the teeth of the outer rotor having been determined, in determining the tooth form of the inner rotor, the radial distance of such centers being similarly determined, and the number of teeth and, therefore, the angular spacing of the teeth being known, such outer rotor and the teeth therefor may be accurately laid out, the flanks of the teeth preferably being connected by surfaces such as 80 and as illustrated in Fig. 1 concentric with the axis 20 of the outer rotor, or equivalent surfaces, preferably but not necessarily so spaced from the axis 20 as to provide approximate contact between them and the crowns of the teeth 14 of the inner rotor when in full mesh position, thereby providing clearance at each side of the crown of the inner teeth when in such full mesh position to provide a small amount of clearance as indicated at 82 in Fig. 1 for reception of any foreign material that might find its way between the elements, thereby to prevent such foreign material from becoming jammed between the teeth of the rotors in operation.

The shape, size and location of the teeth for the outer rotor having once been determined, they may be readily formed by conventional broaching operations, or other suitable or conventional machining operations, as will be readily understood by those skilled in the art.

Having thus described my invention, what I claim by Letters Patent is:

1. In tooth rotors of the class consisting of an inner and an outer rotor one mounted for rotation about an axis eccentric to the other, in which the inner rotor has one less tooth than the outer rotor and teeth of both rotors have substantially continuous contacting relation with respect to each other throughout 360° of rotation of both of said rotors, the combination with said inner rotor of teeth thereon of a cross-sectional configuration taken in a plane perpendicular to the axis of rotation thereof traced by arcs struck from a curve following the path of movement of a point lying within the periphery of a circle which rolls without slippage upon a circle concentric with the axis of the inner rotor and of a diameter greater than the major diameter of the inner rotor, and in which the diameter of the second-mentioned circle has a ratio to the diameter of the first-mentioned circle as the number of teeth on the inner rotor bears to one.

2. In tooth rotors of the class consisting of an inner and outer rotor one mounted for rotation about an axis eccentric to the other, in which the inner rotor has one less tooth than the outer rotor and teeth of both rotors have substantially continuous contacting relation with respect to each other throughout 360° of rotation of both of said rotors, the combination with said inner rotor of teeth thereon of a form of envelopment of arcs struck from a curve produced by a point within the periphery of a circle rolling without slippage upon a second circle concentric with the axis of said inner rotor and of a diameter greater than the major diameter of said inner rotor, said point being at a distance from the center of the first-mentioned circle equal to the eccentricity of the axes of said inner and outer rotors.

3. In tooth rotors of the class consisting of an inner and an outer rotor one mounted for rotation about an axis eccentric to the other, in which the inner rotor has one less tooth than the outer rotor and teeth of both rotors have substantially continuous contacting relation with respect to each other throughout 360° of rotation of both of said rotors, the combination with said inner rotor of teeth thereon of a form of envelopment of arcs struck from a curve produced by a point within the periphery of a circle rolling without slippage upon a second circle concentric with the axis of said inner rotor and of a diameter greater than the major diameter of said inner rotor, said point being at a distance from the center of the first-mentioned circle equal to the eccentricity of the axes of said inner and outer rotors, and the teeth of said outer rotor being partially circular in end view and of a radius substantially equal to the radii of said arcs.

4. In tooth rotors of the class consisting of an inner and an outer rotor one mounted for rotation about an axis eccentric to the other, in which the inner rotor has one less tooth than the outer rotor and teeth of both rotors have substantially continuous contacting relation with respect to each other through 360° of rotation of both of said rotors, the combination with said inner rotor of teeth thereon of a form of envelopment of arcs struck from a curve produced by a point within the periphery of a circle rolling without slippage upon a second circle concentric with the axis of said inner rotor and of a diameter greater than the major diameter of said inner rotor, said point being at a distance from the center of the first-mentioned circle equal to the eccentricity of the axes of said inner and outer rotors, the teeth of said outer rotor being partially circular in end view and of a radius substantially equal to the radii of said arcs, and the second-mentioned circle being of a greater diameter than the major diameter of said inner rotor whereby the center of curvature of said teeth of said outer rotor lie radially outwardly of the base of the teeth of said outer rotor.

NICHOLAS NOREYKO.

REFERENCES CITED

The following references are of record in the file of this patent:

UNITED STATES PATENTS

| Number | Name | Date |
|---|---|---|
| 2,091,317 | Hill | Aug. 31, 1937 |
| 2,031,888 | Hill | Feb. 25, 1936 |
| 1,997,228 | Nichols | Apr. 9, 1935 |
| 1,798,059 | Bilgram et al. | Mar. 24, 1931 |
| 1,833,993 | Hill | Dec. 1, 1931 |